(12) United States Patent
Vo

(10) Patent No.: US 7,946,313 B2
(45) Date of Patent: May 24, 2011

(54) FLEXIBLE PIPE

(76) Inventor: Dang The Vo, Houston, TX (US)

( * ) Notice: Subject to any disclaimer, the term of this patent is extended or adjusted under 35 U.S.C. 154(b) by 593 days.

(21) Appl. No.: 12/042,406

(22) Filed: Mar. 5, 2008

(65) Prior Publication Data

US 2009/0223586 A1 Sep. 10, 2009

(51) Int. Cl.
*F16L 11/00* (2006.01)

(52) U.S. Cl. ........ 138/135; 138/134; 138/140; 138/127; 138/177; 138/172

(58) Field of Classification Search .......... 138/134–138, 138/140, 127, 177, 178, 172
See application file for complete search history.

(56) References Cited

U.S. PATENT DOCUMENTS

| | | | |
|---|---|---|---|
| 956,076 | A | 4/1910 | Greenfield |
| 1,821,328 | A | 9/1931 | Segelhorst |
| 1,847,218 | A | 3/1932 | Lamb |
| 2,076,632 | A | 4/1937 | Goodall |
| 2,234,350 | A | 3/1941 | Muller |
| 2,394,632 | A | 2/1946 | Parker |
| 2,610,869 | A | 9/1952 | Raymond |
| 2,940,778 | A | 6/1960 | Kaiser |
| 3,112,937 | A | 12/1963 | Williams |
| 3,140,106 | A | 7/1964 | Thomas |
| 3,148,898 | A | 9/1964 | Somers |
| 3,217,282 | A | 11/1965 | Chevalier et al. |
| 3,874,064 | A | 4/1975 | Chevalier |
| 3,936,118 | A | 2/1976 | Thiery et al. |
| 4,033,612 | A | 7/1977 | Chevalier |
| 4,567,916 | A | 2/1986 | Antal et al. |
| 4,679,826 | A | 7/1987 | Olsen |
| 4,773,452 | A | 9/1988 | Dotti et al. |
| 4,895,185 | A | 1/1990 | Champleboux et al. |
| 4,950,001 | A | 8/1990 | Briggs |

(Continued)

OTHER PUBLICATIONS

DeepFlex, Inc.; Product Information Sheet—"Non-Metallic Flexible Pipe: Advantages of DeepFlex Composite Pipe;" Retrieved at http://www.deepflex.com/products-advantages.html on Dec. 20, 2007; 1 page.

(Continued)

*Primary Examiner* — Patrick F Brinson
(74) *Attorney, Agent, or Firm* — Wong, Cabello, Lutsch, Rutherford & Brucculeri LLP

(57) ABSTRACT

A flexible pipe for fluid transport especially in offshore application has a first extruded tube having nylon and a first layer having aromatic polyamide disposed about the first tube. A plurality of rings composed of stainless steel are disposed about the first layer. Each of the rings has first ends with circumferential lips and second ends with circumferential grooves interconnecting together. These lips and grooves permit adjacent ones of the rings to tilt relative to one another by about 1.5-degrees for every 4-inches of flexible pipe. A second extruded tube having fiberglass is disposed about the plurality of rings, and an exterior jacket having nylon is disposed about the second tube.

23 Claims, 6 Drawing Sheets

U.S. PATENT DOCUMENTS

| | | | |
|---|---|---|---|
| 5,639,128 A | 6/1997 | Belcher | |
| 5,730,188 A * | 3/1998 | Kalman et al. | 138/135 |
| 5,860,682 A | 1/1999 | Belcher | |
| 5,934,334 A * | 8/1999 | Gray et al. | 138/112 |
| 6,039,083 A | 3/2000 | Loper | |
| 6,273,142 B1 | 8/2001 | Braad | |
| 6,315,002 B1 | 11/2001 | Antal et al. | |
| 6,360,781 B1 | 3/2002 | Braad | |
| 6,363,974 B1 * | 4/2002 | Perez et al. | 138/130 |
| 6,382,681 B1 | 5/2002 | Berton et al. | |
| 6,491,779 B1 | 12/2002 | Bryant | |
| 6,592,153 B1 | 7/2003 | Belcher | |
| 6,691,743 B2 * | 2/2004 | Espinasse | 138/134 |
| 6,701,969 B2 * | 3/2004 | Wilson | 138/137 |
| 6,769,454 B2 * | 8/2004 | Fraser et al. | 138/127 |
| 6,923,477 B2 | 8/2005 | Buon et al. | |
| 7,073,978 B2 | 7/2006 | Bryant | |
| 7,175,208 B2 | 2/2007 | Belcher | |
| 7,254,933 B2 | 8/2007 | Bryant | |

OTHER PUBLICATIONS

DeepFlex, Inc.; Product Information Sheet—"Corrosion Resistant: Basic Pipe Construction;" Retrieved at http://www.deepflex.com/products-construction.html on Dec. 20, 2007; 2 pages.

DeepFlex, Inc.; Product Information Sheet—"Non-Metallic Flexible Pipe: The Next Generation of Un-bonded Pipe," Retrieved at http://www.deepflex.com/products-range.html on Dec. 20, 2007; 1 page.

American Petroleum Institute, "Recommended Practice for Flexible Pipe," API Recommended Practice 17B, Third Edition, Mar. 2002, 166 pages.

Alex Chin, "Development of a Risk-Based Inspection and Monitoring Program for Subsea Flexible Flowlines, Case Study: Wanaea and Cossack Fields," Final Year Thesis Project, Centre for Oil/Gas Engineering, The University of Western Australia, 2002, 164 pages.

* cited by examiner

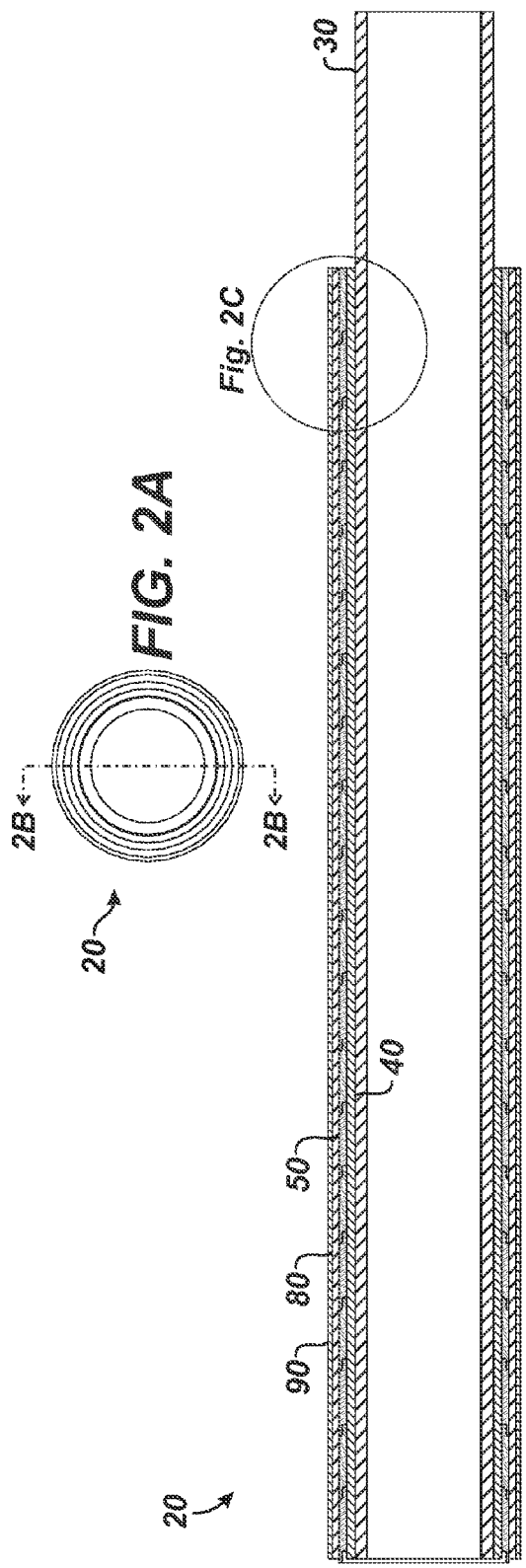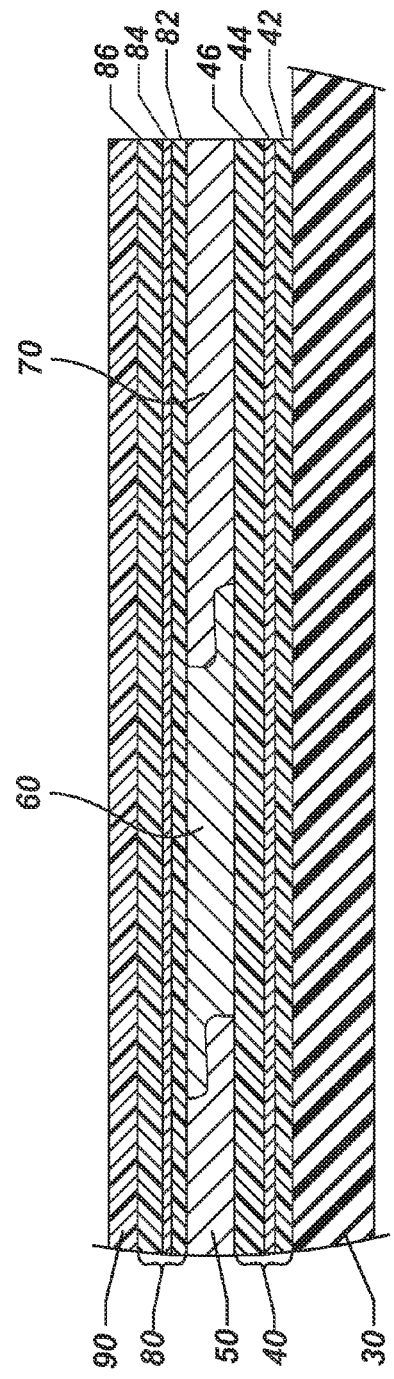

FLEXIBLE PIPE

BACKGROUND

Flexible pipe can be used for fluid transport in various areas, such as conducting production fluids offshore. For example, FIGS. 1A-1B show a flexible pipe 10 similar to that designed by Deepflex, Inc. of Houston, Tex. and disclosed in U.S. Pat. Nos. 6,491,779 and 7,254,933. The pipe 10 can be used in deep sea operations such as disclosed in U.S. Pat. No. 7,073,978. In general, the pipe 10 can have internal diameters of 2, 4, 6, 8, or even up to 16-inches. From inside to outside, the flexible pipe 10 has a number of layers, including a liner layer 11, pressure reinforcement layers 12, hoop reinforcement layers 13, a membrane 14, tensile reinforcement layers 15, and an external jacket 16.

The liner layer 11 is composed of extruded thermoplastic, such as HDPE, PA-11, PVDF and XLPE, and the membrane 14 is made of extruded thermoplastic to seal against compressive loads from external seawater pressure. On the outside, the external jacket 16 is made of extruded thermoplastic to provide external protection to the pipe 10.

Internally, wraps helically wound about the pipe 10 form each of the reinforcement layers 12, 13, and 15. These wraps are made of composite material bonded and stacked together to form composite tapes. As their names imply, the pressure layers 13 are wound for external pressure loads, and the tensile layers 15 are wound for tensile loads. Likewise, the hoop layers 13 are wound for compressive loads.

Because flexible pipes can be used in conditions having high internal and/or external pressures, any rupture in one of the layers such as the pipe's inner layer can allow pressurized fluid to leak through to other surrounding layers. If those surrounding layers have gaps in them such as formed by wrapped tapes, then nothing essentially keeps the pressurized leak from reaching even more layers of the pipe.

BRIEF DESCRIPTION OF THE DRAWINGS

FIG. 2A illustrates an end view of a flexible pipe according to the present disclosure.

FIG. 2B illustrates a cross-sectional view of the flexible pipe of FIG. 2A showing the various layers.

FIG. 2C illustrates an isolated portion of the flexible pipe's cross-section showing details of the various layers.

DETAILED DESCRIPTION

Figure 1A:
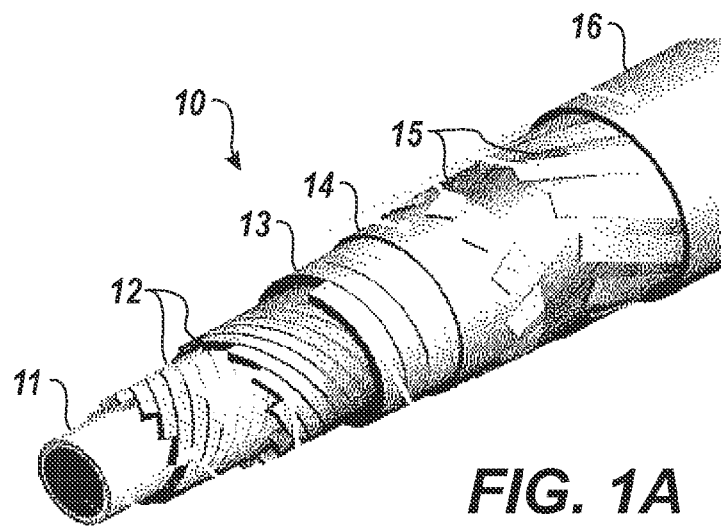
FIG. 1A illustrates a perspective view of a flexible pipe according to the prior art showing the various layers.
Figure 1B:
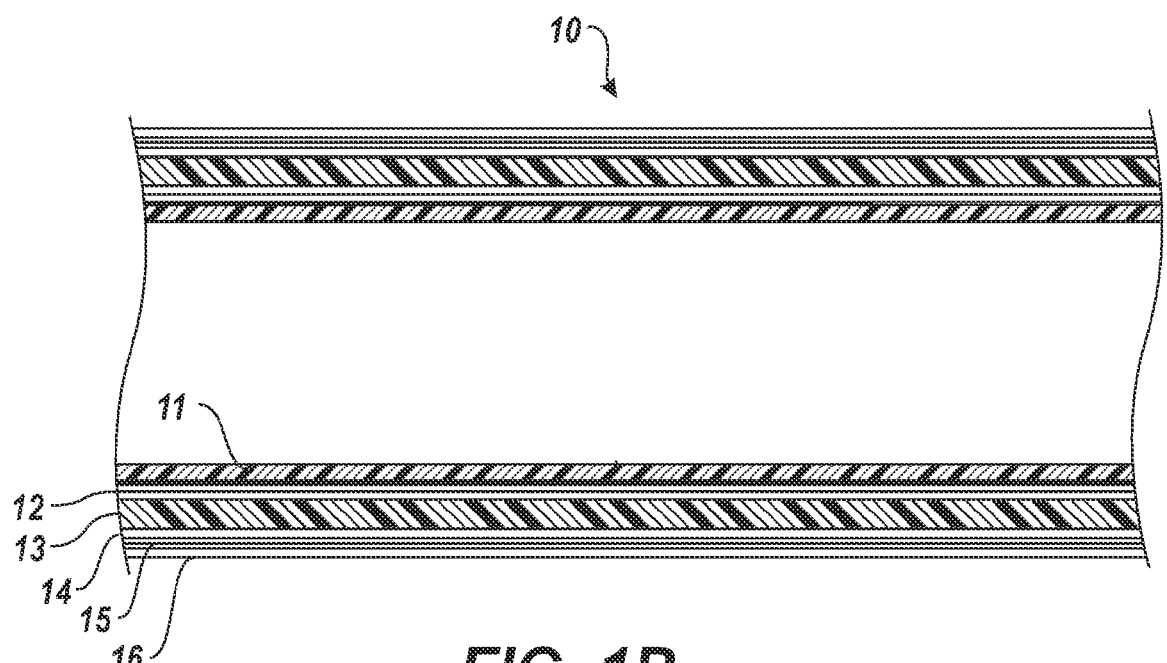
FIG. 1B illustrates a cross-sectional view of the flexible pipe of FIG. 1A.

A flexible pipe 20 shown in FIGS. 2A-2C has a plurality of layers, including from inside to out: a liner layer 30, a first tensile layer 40, a ringed layer 50, a second tensile layer 80, and an external jacket 90. The liner layer 30 is an extruded tube made of a plastic material, such as a composite thermoplastic or the like. Choice of the particular material depends on the intended use of the pipe 20. In one example, the liner layer 30 is composed of extruded nylon and Fortron® polyphenylene sulfide (PPS) (a high performance thermoplastic).

The ringed layer 50 is composed of a plurality of interlocking rings 60/70 discussed in more detail later. The external jacket 90 is composed of a hard plastic material for protection. For example, the jacket 90 can be composed of a nylon material, such as Ultramid® polyamide (nylon) from BASF Corporation for resistance to abrasion, corrosion, and high temperature (ULTRAMID is a registered trademark of BASF Aktiengesellschaft Corporation of Germany), although other materials can be used.

As their names imply, the tensile layers 40 and 80 provide tensile strength to the flexible pipe 20 as well as strength against internal/external pressure loads. Both tensile layers 40 and 80 are preferably strong enough to carry longitudinal (tensile) stresses up to 25-kpsi along the axis of the pipe 20. In the present arrangement and as best shown in FIG. 2C, each of the tensile layers 40/80 can be composed of several layers, including an extruded tube 42/82, a reinforcement layer 44/84, and a surrounding hard shell 46/86. Although two tensile layers 40/80 are shown in the present arrangement, other arrangements may have only one tensile layer either inside or outside the ringed layer 50. In addition, although the tensile layers 40/80 are shown having three layers, other arrangements may have more or less layers.

In the current arrangement, the extruded tubes 42/82 can be composed of a hard plastic material, such as a similar thermoplastic to the liner layer 30. The reinforcement layers 44/84 have fiber or wire woven or wrapped on the extruded tubes 42/82 to provide tensile strength to the pipe 20. These layers 44/84 can be composed of a heat-resistant and strong synthetic fiber, such as an aromatic polyamide ("aramid") (one type of which is Kevlar®), or can be composed of metal wire. (KEVLAR is a registered trademark of E. I. du Pont de Nemours and Company. The surrounding shells 46/86 can be a hard plastic material extruded around the reinforcement layer 44/84.

As best shown in FIG. 2C, the ringed layer 50 is comprised of a series of interconnecting rings, including central rings 60 and an end ring 70 as shown. Each of the central rings 60 interlock end to end to one another in an interlocking arrangement that still allows for bending or tilting between the rings 60 when the pipe 20 is flexed or bent. The end ring 70 interlocks at one end to a central ring 60 and has a terminated end that does not interlock with another ring.

The rings 60/70 can be composed of metal or composite material. For example, each of the rings 60/70 can be cast of 17-4 stainless steel with electroless nickel/fluoropolymer coating (e.g., Xylan®—a registered trademark of Whitford Corporation of West Chester, Pa.) for rust prevention. Alternatively, the rings 60/70 can be composed of a composite material, such as carbon-fiber or glass reinforced plastic, fiber thermoplastic, or thermoplastic formulated with metal powder, although other materials are also possible depending on the desired use of the flexible pipe 20. Due to the reinforced strength of these rings 60/70, the flexible pipe 20 can preferably withstand inside and outside pressures better than a flexible pipe composed entirely of extruded or wrapped layers, yet still provide the flexibility needed for the pipe 20 to be used in various applications, such as deep sea oil production.

Assembly of the pipe 20 is as follows. The liner layer 30's extruded plastic tube is formed with the desired internal bore diameter and wall thickness for the particular implementation. In one arrangement, the first tensile layer 40 is independently formed as a unit having its three layers 42/44/46 and having a suitable internal bore diameter and wall thickness and is fit over the liner layer 30. In another arrangement, the extruded tube 42 of the first tensile layer 40 is independently formed and fit onto the liner layer 30 or is extruded directly onto the liner layer 30, then the woven layer 44 is formed onto the outside of this extruded tube 42, and finally the outer shell 46 is extruded over the entire assembly.

With the first tensile layer 40 completed, the various rings 60/70 are positioned over the first tensile layer 40 in interlocking arrangement. Naturally, the first tensile layer 40's outer diameter and the ring 60/70's internal diameters are configured to fit together. The rings 60/70 may be wrapped with tape or the like to hold them together during assembly. Next, the second tensile layer 80 having its three layers 82/84/86 and having a suitable internal bore diameter and wall thickness is positioned or formed over the rings 60/70. As before, the second tensile layer 80 can be independently formed as a unit and fit over the rings 60/70, or the separate layers 82/84/86 can be separately positioned or formed on the assembly. Finally, the external jacket 90 is extruded on the outside of the entire assembly to complete the pipe 20.

Figure 3A:
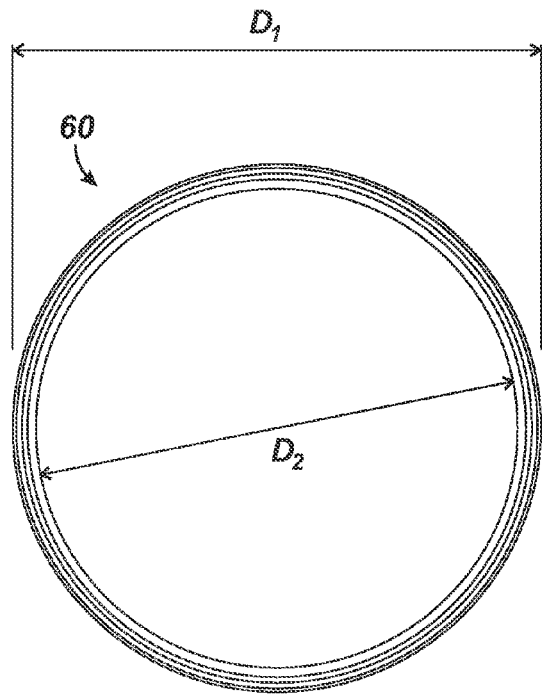
FIGS. 3A, 3B, and 3C illustrate an end view, a cross-sectional view, and a detailed view of a central ring for the flexible pipe's ringed layer.
Figure 3B:
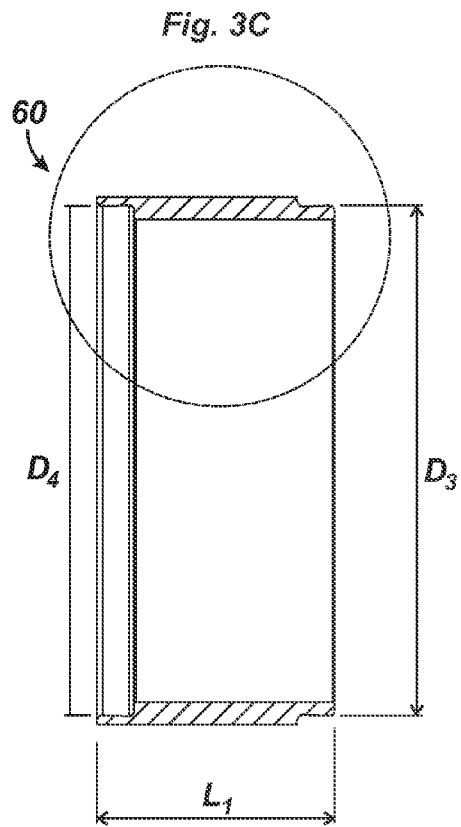
Figure 3C:
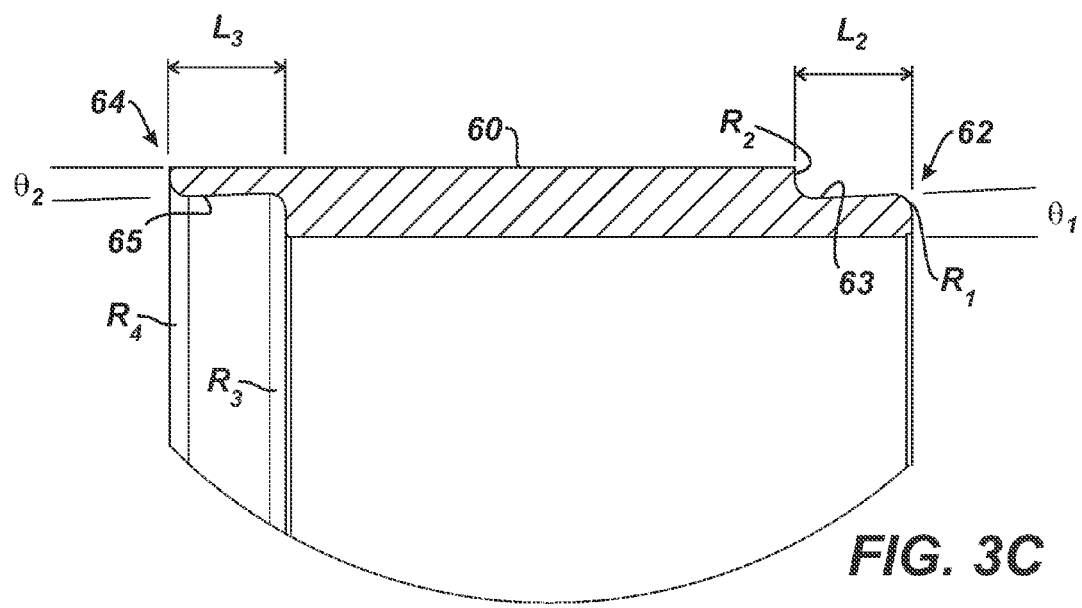

As discussed above, the ringed layer 50 has several interconnecting central rings 60—an example of which is shown in more detail in FIGS. 3A-3C. The central ring 60 has an external diameter $D_1$, an internal diameter $D_2$, and a length $L_1$. For a flexible pipe 20 with an internal bore of about 6-inches, the ring 60's external diameter $D_1$ can be about 8.885-inches, the internal diameter $D_2$ can be about 8.135-inches, and the length $L_1$ can be about 4.000-inches. Because these and other values disclosed herein pertain to a flexible pipe 20 with about a 6-inch internal diameter, it is understood that the various values for the pipe's components will differ for different diameter pipes and for particular implementations.

One end of the ring 60 has a circumferential lip 62, while the other end has a circumferential slot 64. When rings 60 couple end to end, the circumferential lip 62 interconnects with a circumferential slot 64 on an adjacent central ring 60. In the exemplary dimensions, the lip 62 defines an overall diameter $D_3$ of about 8.595-inches, and the slot 64 defines an overall inner diameter $D_4$ of about 8.575-inches.

Because the rings 60 fit together and are intended to tilt relative to one another, the circumferential lip 62 defines an outer profile 63 as shown in FIG. 3C for fitting and moving against a complementary inner profile 65 of the circumferential slot 64. The outer profile 63 extends a length $L_2$ of about 0.630-inches, while the inner profile 65 extends a length $L_3$ of about 0.625-inches. In addition, the lip 62 defines an angular slant $\theta_1$ outward of about 2.65-degrees, while the slot 64 defines an angular $\theta_2$ slant inward of about 1.94-degrees. Furthermore, the lip 62's outer edge defines a radius $R_1$ of 0.096-inches, and its inner edge defines a radius $R_2$ of about 0.096-inches. Likewise, the slots 64's inner edge defines radius $R_3$ of 0.091-inches, and its outer edge defines radius $R_4$ of 0.096-inches.

Figure 4A:
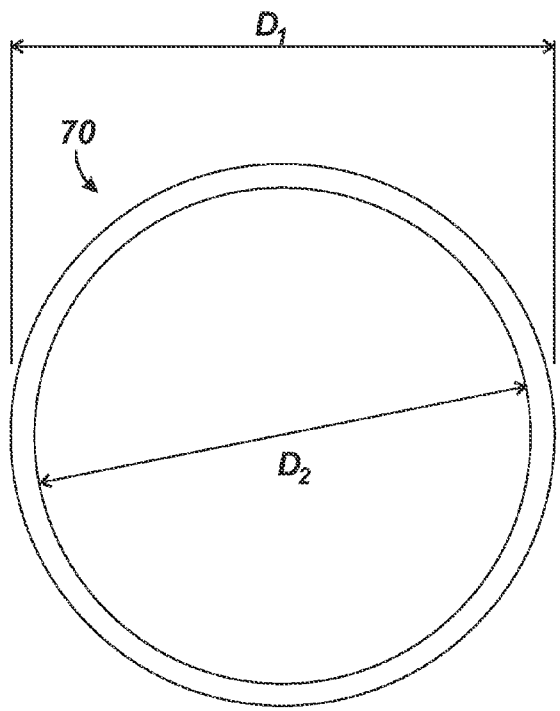
FIGS. 4A, 4B, and 4C illustrate an end view, a cross-sectional view, and a detailed view of an end ring for the flexible pipe's ringed layer.
Figure 4B:
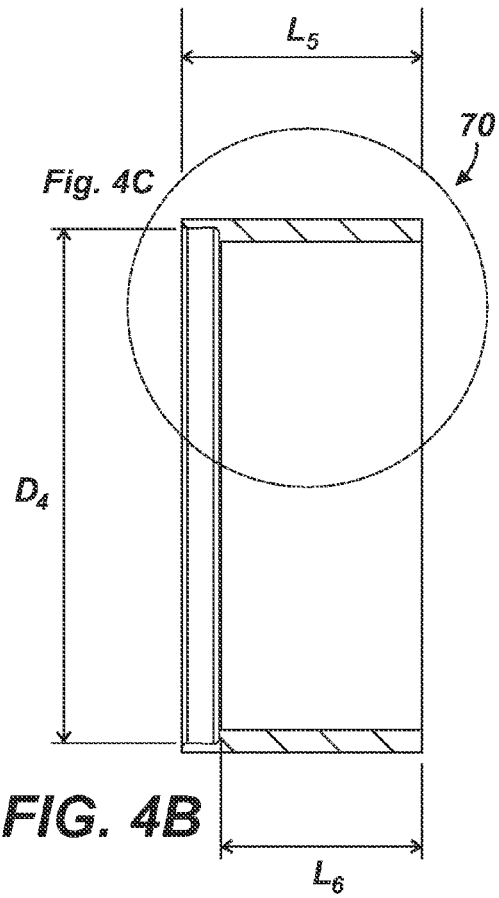
Figure 4C:
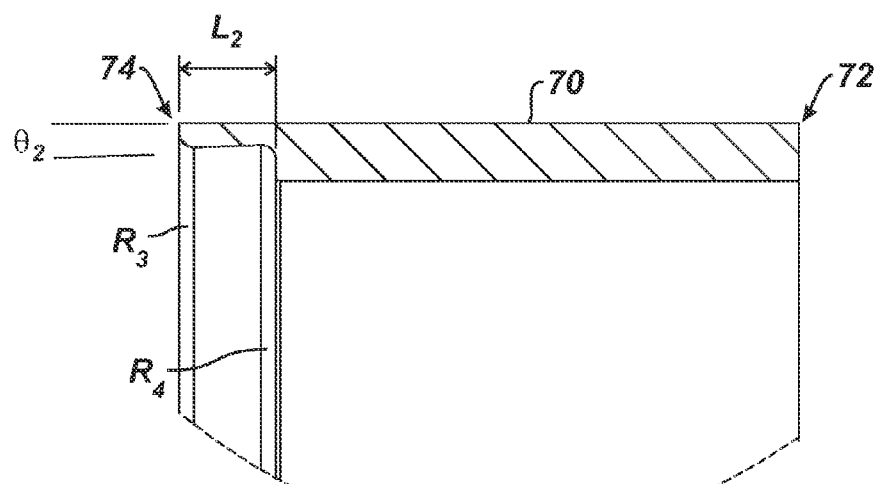

As shown in FIGS. 4A-4C, the end ring 70 is very similar to the central ring 60 discussed above. For example, the end ring's circumferential slot 74 is essentially identical to the central ring 60's slot 64 of FIGS. 3A-3C having dimensions $L_2$, $R_3$, $R_4$, and $\theta_2$ so it can interconnect with a central ring's circumferential lip 62. The ring's other end 72, however, is terminated and has no slot or lip. Although not shown, an opposite end ring for the flexible pipe can similarly be made for fitting on an opposing slot 64 of a central ring 60 of FIGS. 3A-3C and can have a terminated end and a lipped end with dimensions $L_1$, $R_2$, $R_3$, and $\theta_1$.

Figure 5:
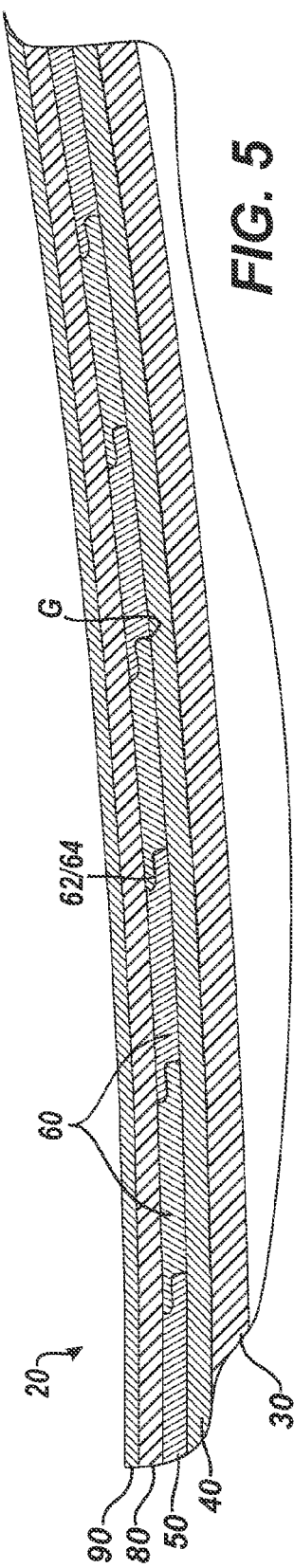
FIG. 5 shows the wall of the flexible pipe as bent.

The rings 60/70 with the associated dimensions discussed above enable the interconnected rings 60/70 to be bent or tilted relative to one another by about 1.5 degrees for every 4-inches (i.e., about 1.5-degrees for every length of ring in the flexible pipe 20). For example, FIG. 5 shows a wall of the flexible pipe 20 as bent with each of the central rings 60 tilted at about 1.5-degrees relative to one another. Preferably, gaps G that may occur between the rings 60 where they interconnect are minimal, and sharp edges on the rings 60 are avoided. The other layers 30/40/80/90 being composed of materials such as plastic, fiberglass, composites, etc., readily flex with the bending of the pipe 20.

Figure 6:
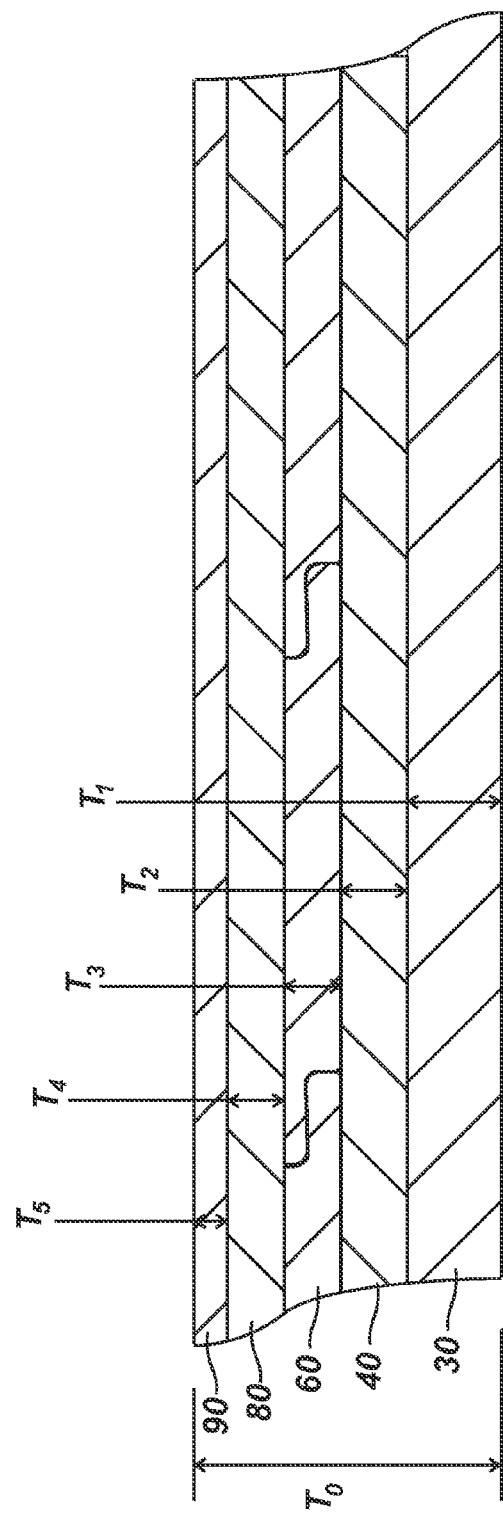
FIG. 6 shows example thicknesses of the flexible pipe's layers.

Various dimensions for the pipe's layers 30/40/50/80/90 have been provided above for illustrative purposes. As shown in FIG. 6 and in the table below, the layers 30/40/50/80/90 in general have wall thicknesses that make up the following example percentages of a flexible pipe's overall wall thickness in which the pipe has about a 6-inch internal bore:

TABLE

Each Layer's Percentage of Overall Pipe Wall Thickness

| Layer | Wall Thickness (inches) | Percentage of Overall Pipe Wall Thickness |
|---|---|---|
| 30 - Inner Layer | $T_1 = 1.3$ | 31% |
| 40 - First Tensile layer | $T_2 = 0.95$ | 22% |
| 50 - Ring Layer | $T_3 = 0.75$ | 18% |
| 80 - Second Tensile layer | $T_4 = 0.75$ | 18% |
| 90 - External Jacket | $T_5 = 0.46$ | 11% |
| All Layers | $T_0 = 4.0$ | 100% |

The above dimensions are provided merely for illustrative purposes. It will be appreciated that the various thickness of the layers will depend on the needs of a particular implementation, including, for example, pressure levels, tensile strength, length of the pipe, intended use of the pipe, materials selected, etc.

Figure 7:
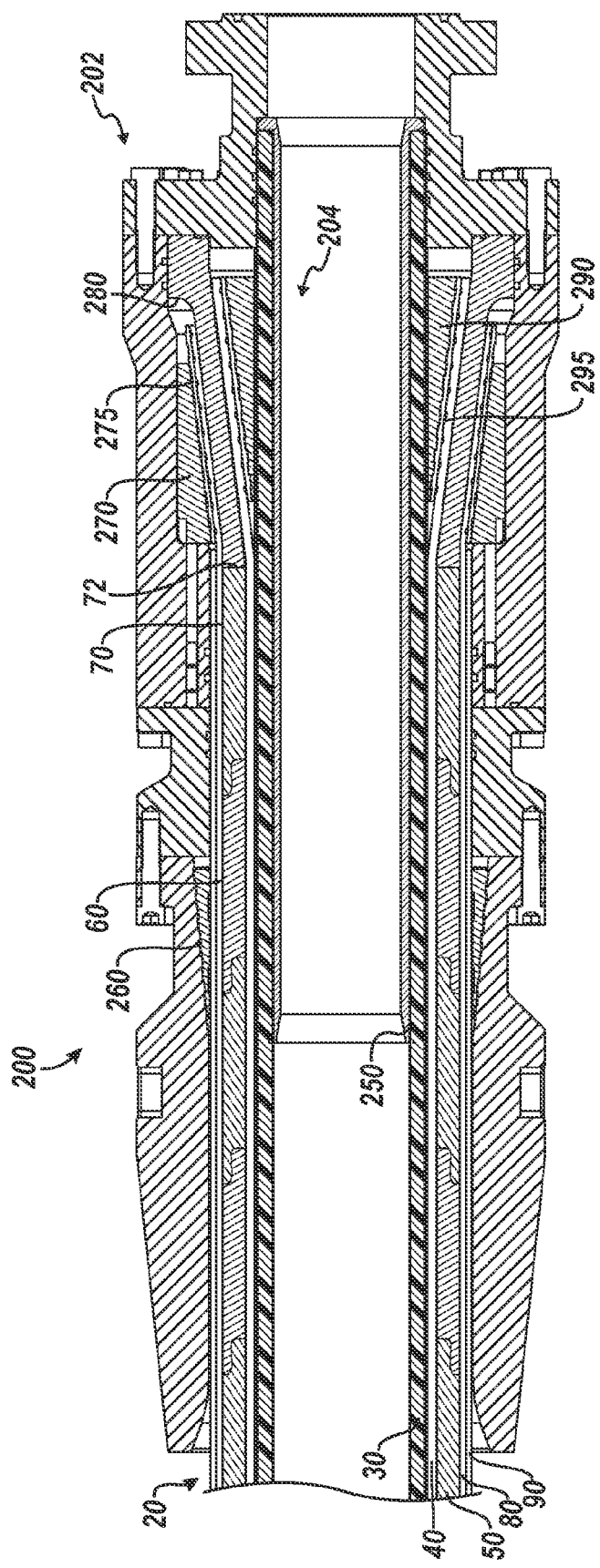
FIG. 7 shows an end of the flexible pipe connected to an end connector.

The flexible pipe 20 can be used with end connectors such as disclosed in co-pending U.S. application Ser. No. 11/961,709 entitled "End Connector for Flexible Pipe," which is incorporated herein by reference in its entirety. FIG. 7 shows an end of the flexible pipe 20 connected to one such end connector 200 of the incorporated application. As shown, the end connector 200 has an outer housing 202 and inner components 204, both of which are essentially the same as those disclosed in the incorporated application. As part of the inner components 204, locks comprising nuts and sleeves (270/275 and 290/295) mechanically grip the pipe 20's tensile layers 40/80 against an insert 280. In addition, the insert 280's end fits against the terminated end 72 of the end ring 70.

The flexible pipe 20's other layers 30/90 are handled in similar ways to like layers described in the incorporated application. For example, a tubular insert 250 fits within the inner surface of the liner layer 30, which also has an inner nut 290 positioned against part of its outer surface. Elsewhere along the pipe 20, another lock 260 threads into a portion of the connector 200's outer housing 202 and grips against the pipe's external jacket 90.

As disclosed above, the pipe 20 of FIGS. 2A-2C has five layers 30/40/50/80/90. However, variations of the disclosed flexible pipe 20 are possible. For example, the flexible pipe 20 can be composed of more or less layers depending on the implementation. In one variation, the flexible pipe 20 may include tensile layer 40, ringed layer 50, and tensile layer 80 with either one or both of the liner layer 30 and external jacket 90 not included. In another variation, one of the tensile layers 40 or 80 may not be included in the pipe 20. Alternatively, one of the tensile layers 40 or 80 may not have multiple layers and may simply include an extruded tube of plastic material. In other words, the flexible pipe 20 can at least include at least one first layer, a ringed layer 50 having interconnected rings (e.g., 60/70) disposed about the at least one first layer to provide strength to the pipe 20 against pressure loads, and at least one second layer disposed about the ringed layer 50, wherein at least one of the first or second layers provides tensile strength to the flexible pipe 20.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A flexible pipe, comprising:
   at least one first layer comprising a first extruded tube, a first intermediate layer composed of wrapped or woven material disposed about the first extruded tube, and a first outer layer disposed about the first intermediate layer;
   a plurality of rings disposed about the at least one first layer, each of the rings having first ends with circumferential lips and second ends with circumferential grooves interconnecting together, the circumferential lips and grooves of the rings permitting tilting between adjacent ones of the interconnected rings, the interconnected rings providing strength to the pipe from pressure loads; and
   at least one second layer disposed about the plurality of rings,
   wherein at least one of the first or second layers provides tensile strength to the pipe.

2. The pipe of claim 1, wherein the at least one first layer comprises an inner extruded tube having an inner bore and disposed in the first extruded tube.

3. The pipe of claim 1, wherein the first intermediate layer comprises an aromatic polyamide fiber.

4. The pipe of claim 1, wherein the at least one second layer comprises:
   a second extruded tube disposed about the rings,
   a second intermediate layer composed of wrapped or woven material disposed about the second extruded tube, and
   a second outer layer disposed about the second intermediate layer.

5. The pipe of claim 1, further comprising an exterior layer disposed about the at least one second layer.

6. The pipe of claim 1, wherein the plurality of rings comprises metal, stainless steel, or composite material.

7. A flexible pipe, comprising:
   an inner layer defining an internal bore;
   a first layer disposed about the inner layer and providing tensile strength to the pipe, the first layer comprising an extruded tube disposed about the inner layer, an intermediate layer composed of wrapped or woven material disposed about the extruded tube, and an outer layer disposed about the intermediate layer;
   a plurality of rings disposed about the first layer, each of the rings having first ends with circumferential lips and second ends with circumferential grooves interconnecting together, the interconnected rings providing strength to the pipe from pressure loads; and
   a second layer disposed about the plurality of rings and providing tensile strength to the pipe.

8. The pipe of claim 7, wherein the inner layer comprises an extruded tube composed of a plastic material.

9. The pipe of claim 7, wherein the intermediate layer comprises an aromatic polyamide fiber.

10. The pipe of claim 7, wherein the second layer comprises:
    an extruded tube disposed about the rings,
    an intermediate layer composed of wrapped or woven material disposed about the extruded tube, and
    an outer layer disposed about the intermediate layer.

11. The pipe of claim 7, wherein the plurality of rings comprises metal, stainless steel, or composite material.

12. The pipe of claim 7, further comprising an exterior layer disposed about the second layer.

13. The pipe of claim 7, wherein the circumferential lips and grooves of the rings permit tilting between interconnected ones of the rings.

14. A flexible pipe, comprising:
    an inner extruded tube having an internal bore;
    a plurality of first tensile layers disposed about the first extruded tube and providing tensile strength to the pipe;
    a plurality of rings disposed about the first layers, each of the rings having first ends with circumferential lips and second ends with circumferential grooves interconnecting together, the circumferential lips and grooves of the rings permitting tilting between adjacent ones of the interconnected rings, the interconnected rings providing strength to the pipe from pressure loads; and
    a plurality of second tensile layers disposed about the plurality of rings and providing tensile strength to the pipe.

15. The pipe of claim 14, wherein the inner extruded tube comprises a plastic material.

16. The pipe of claim 14, wherein the plurality of first tensile layers comprise:
    a first extruded tube disposed about the inner extruded tube,
    an intermediate layer composed of wrapped or woven material disposed about the first extruded tube, and
    an outer layer disposed about the intermediate layer.

17. The pipe of claim 16, wherein the intermediate layer comprises an aromatic polyamide fiber.

18. The pipe of claim 14, wherein the plurality of second tensile layers comprise:
    an extruded tube disposed about the rings,
    an intermediate layer composed of wrapped or woven material disposed about the extruded tube, and
    an outer layer disposed about the intermediate layer.

19. The pipe of claim 14, wherein the plurality of rings comprises metal, stainless steel, or composite material.

20. The pipe of claim 14, further comprising an exterior layer disposed about the second tensile layers.

21. The pipe of claim 14, wherein the rings comprise individual cylinders disposed end-to-end to one another with the first ends interconnected to the second ends.

22. The pipe of claim 1, wherein the rings comprise individual cylinders disposed end-to-end to one another with the first ends interconnected to the second ends.

23. The pipe of claim 7, wherein the rings comprise individual cylinders disposed end-to-end to one another with the first ends interconnected to the second ends.

* * * * *